United States Patent [19]

Sabee

[11] 4,223,063
[45] Sep. 16, 1980

[54] PATTERN DRAWING OF WEBS, AND PRODUCT PRODUCED THEREBY

[76] Inventor: Reinhardt N. Sabee, 728 S. Summit St., Appleton, Wis. 54911

[21] Appl. No.: 16,764

[22] Filed: Mar. 2, 1979

Related U.S. Application Data

[62] Division of Ser. No. 711,007, Jul. 30, 1976, Pat. No. 4,153,664.

[51] Int. Cl.$^2$ ............................................. D03D 3/00
[52] U.S. Cl. ..................................... 428/224; 28/100; 28/279; 428/225; 428/288
[58] Field of Search ............... 428/107, 108, 112, 195, 428/224, 903, 288, 225; 28/100, 279

[56] References Cited

U.S. PATENT DOCUMENTS

| 3,041,706 | 7/1962 | Bromley et al. | 28/279 |
| 3,293,719 | 12/1966 | Hitomi et al. | 28/252 |
| 3,542,634 | 11/1970 | Such et al. | 428/198 |

Primary Examiner—James J. Bell
Attorney, Agent, or Firm—Wheeler, Morsell, House & Fuller

[57] ABSTRACT

A process for differentially drawing films and nonwoven fiberous webs for increased drapability and strength of webs including at least in part cold drawable polymeric materials or blends thereof including incompatible polymer blends and polymeric matrixes having inorganic fillers draws portions of the web and leaves other portions undrawn. The process involves the subjecting of the web to two or more pairs of meshing toothed rollers to produce a fabric having a pattern of spaced apart undrawn quadrilateral shaped islands bounded fully on each of their four sides by an axially drawn area. Each undrawn island is contiguous at each of its four apices to a biaxially drawn area. The preferred tooth form for the rollers is involute or cycloidal. The processed film or web is larger in area than the original, has a lower basis weight, and has greatly enhanced strength, softness, bulk, texture and drapability.

8 Claims, 26 Drawing Figures

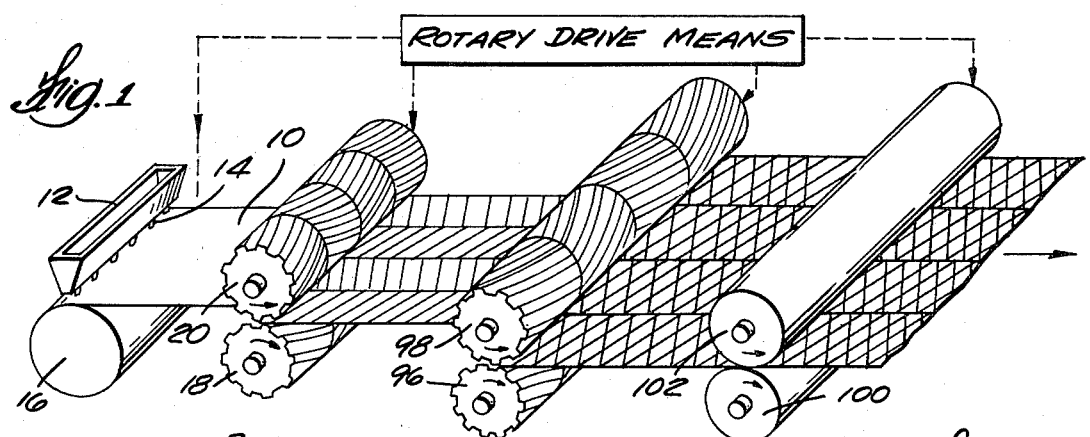
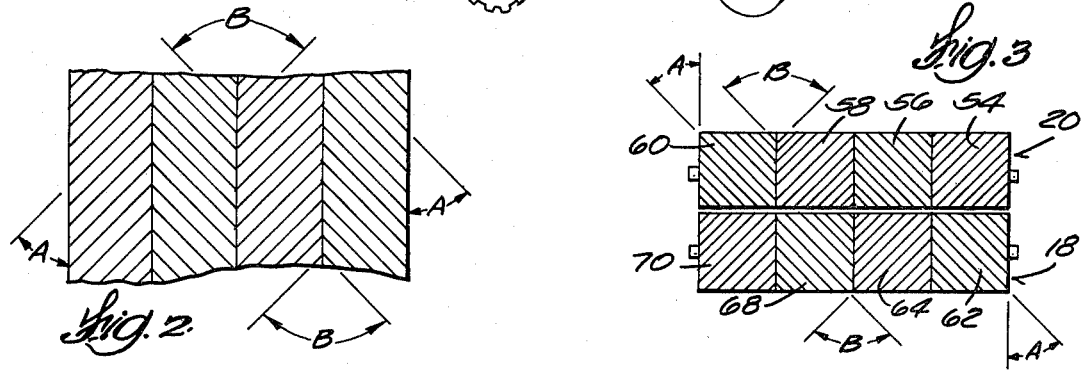
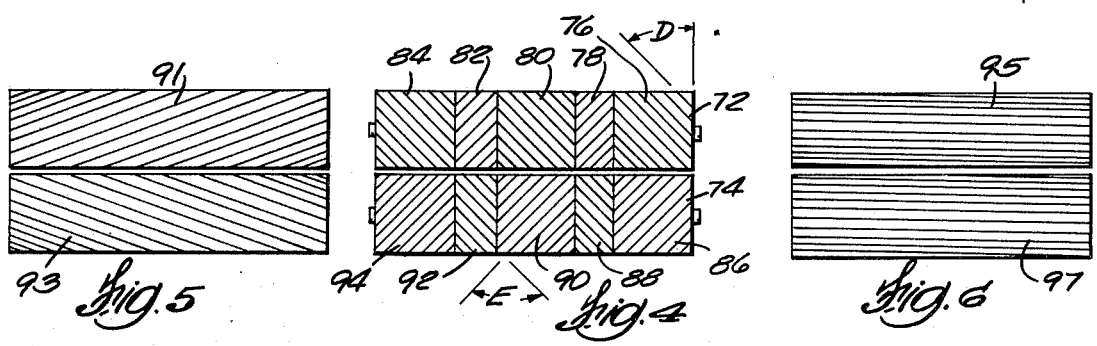
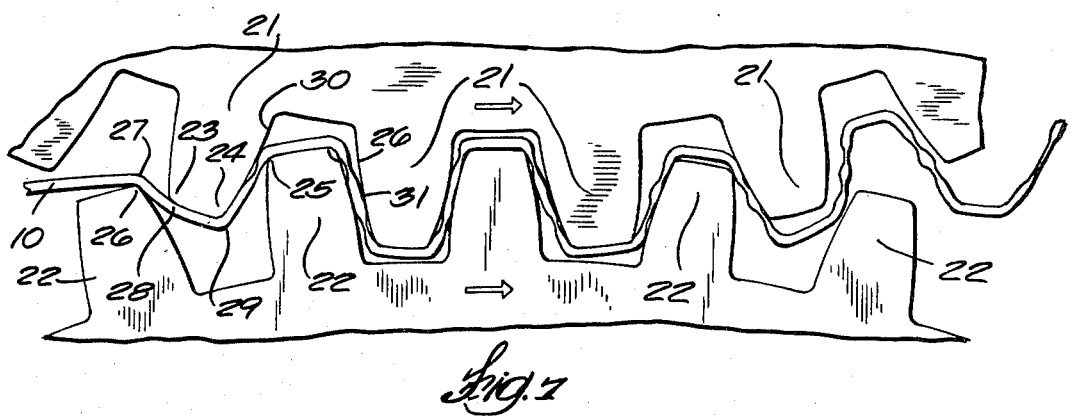

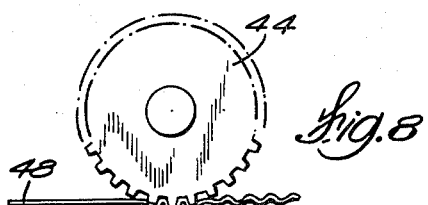
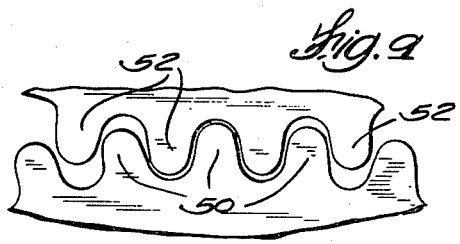
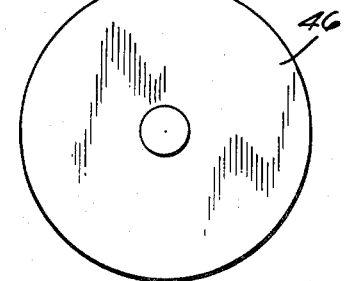
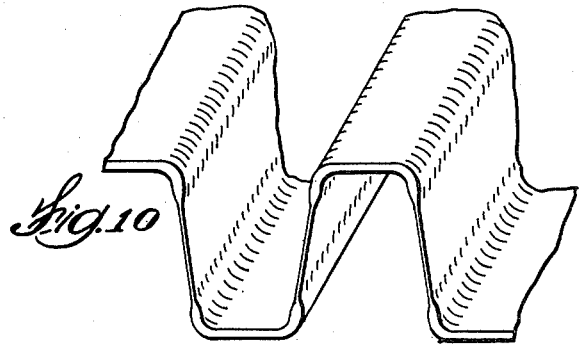
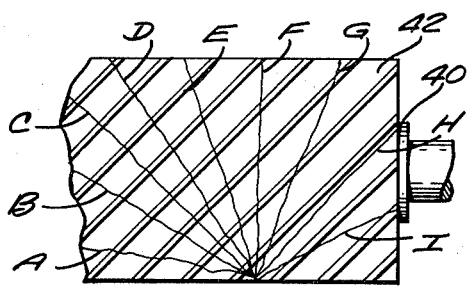
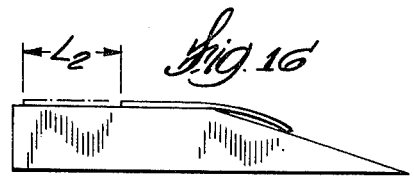
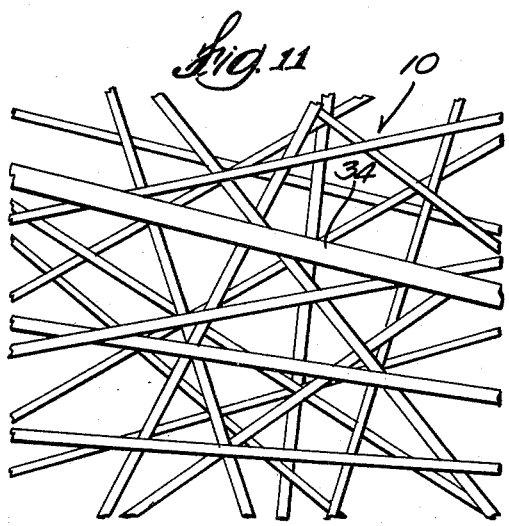
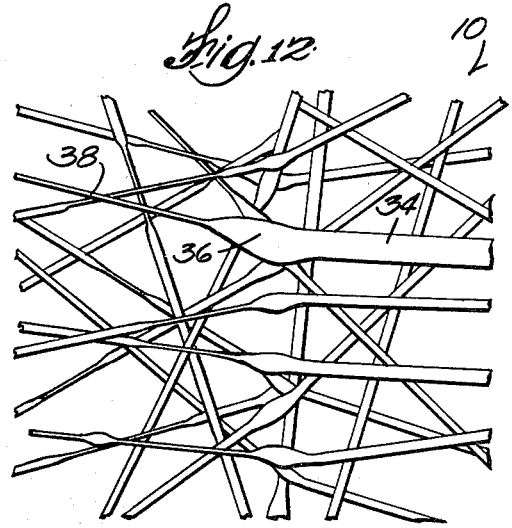

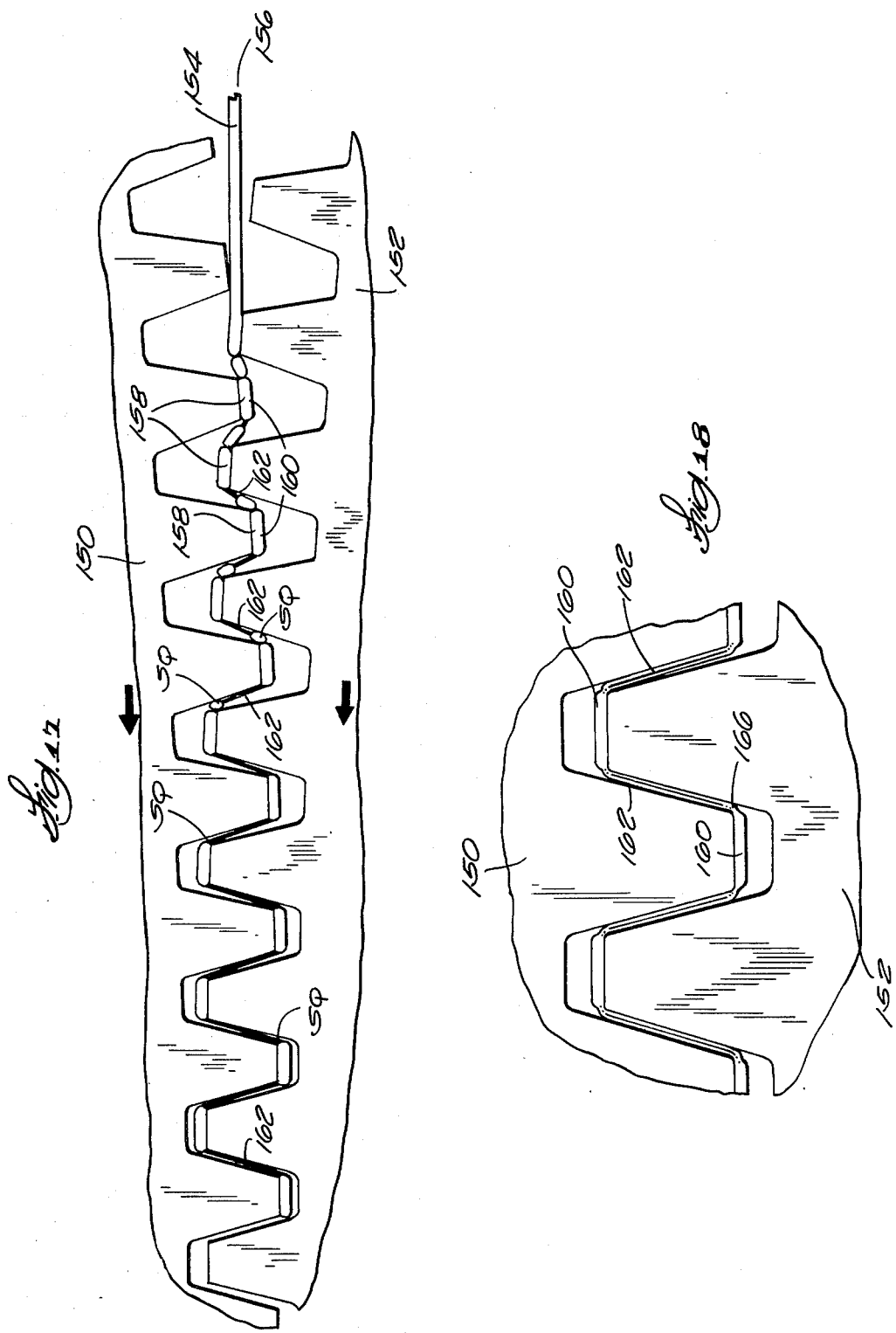

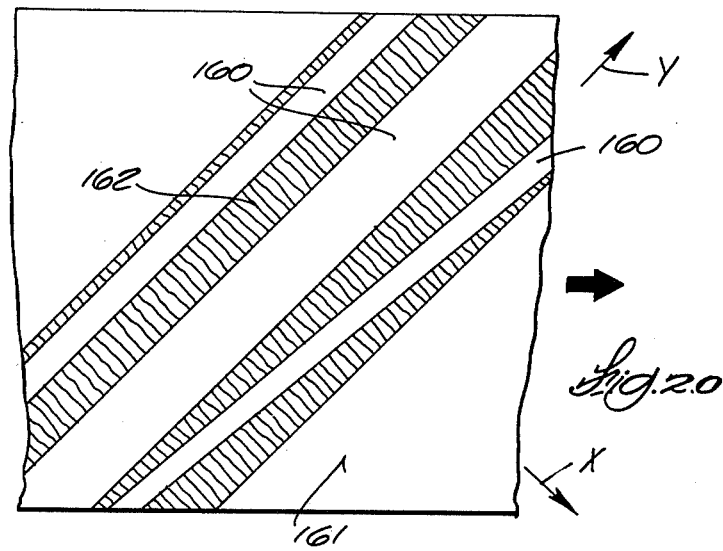
Fig. 2.0
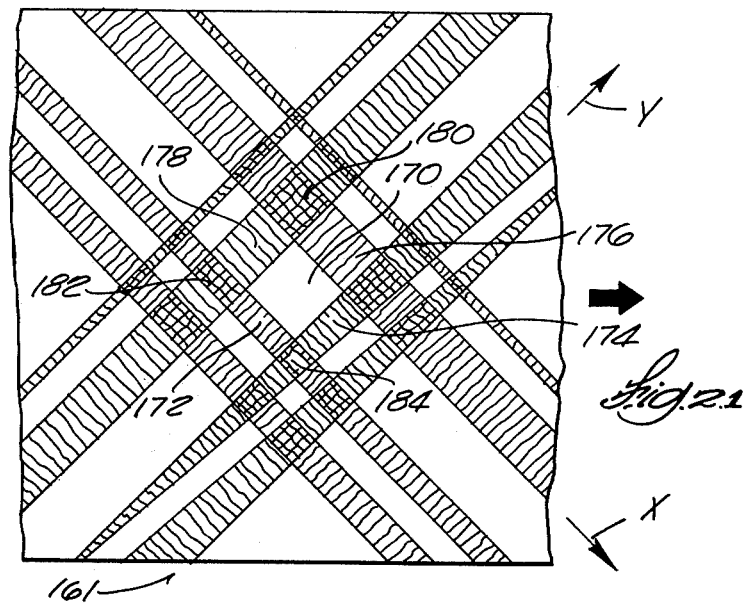
Fig. 2.1
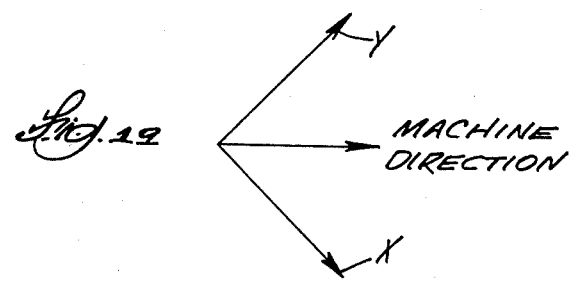
Fig. 19

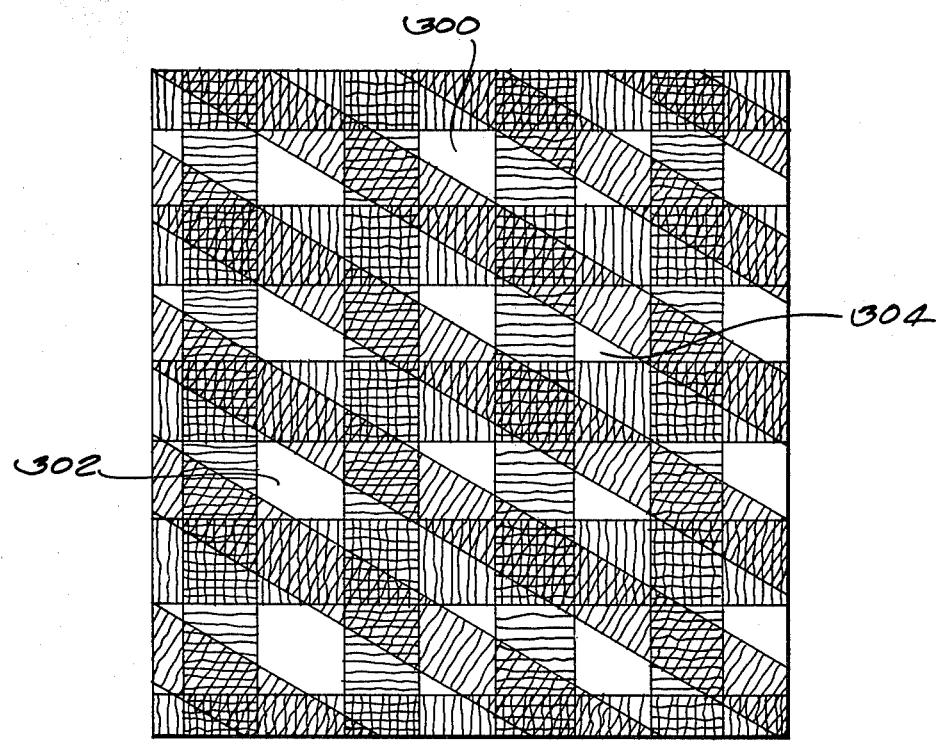
Fig. 2.6

PATTERN DRAWING OF WEBS, AND PRODUCT PRODUCED THEREBY

This is a divisional of application Ser. No. 711,007, filed July 30, 1976, now U.S. Pat. No. 4,153,664.

BACKGROUND OF THE INVENTION

This invention relates to the manufacture of melt-blown or spun-bonded fabrics and combinations thereof with other natural or synthetic fibers such as wood pulp, cotton, hemp, rayon, polyester, nylon, or the like.

Melt-blown fabrics are relatively new in the art, and although they offer the advantage of extremely low cost, they have not achieved widespread acceptance as yet due to their relative stiffness and lack of drapability. Melt-blown fabrics are usually manufactured by blowing a line of molten polypropylene, polyethylene, or other synthetic filaments downwardly onto a moving condensing surface with sufficient force to randomly disentangle the molten filaments just before they harden. The velocity of the air stream at the melt-blowing spinnerets can be controlled to produce a web made of fibers having a finite length or continuous filaments or combinations of both. The word "strand" as used hereinafter in the specification and claims of this application is hereby defined to mean fibers or filaments or both. A melt-blown web can also be deposited on one or both sides of a moving layer of wood pulp, cotton or rayon linters, or similar absorbent fibers which are temporarily held in place by suction to keep the fibers from scattering under the melt-blowing spinnerets. A binder can be added later to help hold the pulp layer together.

The melt-blown fabric produced by the above-described process is an entangled, partially-fused network of synthetic strands that are relatively brittle and are relatively weak because of their undrawn condition. There are several prior art methods of drawing webs by gripping the edges of the web and pulling the gripped edges apart, e.g. through the use of diverging belts or tentering frames, but these methods are not applicable to melt-blown webs because such webs are relatively non-uniform, i.e. they contain areas where the web is thinner and less dense than it is in the thicker places. Therefore, gripping the web at the edges and stretching the web tends to stretch the thin areas and leave the thick areas unchanged. This increases the nonuniformity of the web and makes it more susceptible to tearing. Also this type of stretching does nothing to improve the softness, bulk, drapability, and texture, which are all quite poor in melt-blown or spun-bonded fabrics and tend to restrict the use of these fabrics and to impede their acceptance.

Embossing webs using toothed rollers is not related to the invention described herein. Embossing constitutes compression deformation or crushing rather than tensile deformation. Furthermore, embossing doesn't orient molecules or increase strength as does the draw process of this invention.

SUMMARY OF INVENTION

In accordance with the invention, a method and apparatus are provided for producing a fabric or web with a quilted pattern of discrete axially, biaxially, multiaxially or partially drawn areas and spaced apart, substantially undrawn or partially drawn islands. The webs processed in accordance with the invention have increased capabilities of absorbing higher shock loads before rupturing and increased strength as compared with unprocessed webs of like basis weight. Partially drawn means that the web was not stretched to its natural draw limit. Completely drawn means the web is drawn up to its natural draw limit in the direction of drawing. Substantially undrawn means uniform thickness with no sudden decrease in thickness.

The drawn areas in accordance with the process are strong and substantially unyieldable to further stretch, yet when the web is subjected to a further loading the undrawn areas begin to draw, thereby dissipating the load over a wider area, decreasing the possibilities of rupturing.

The drawn areas of the web are thinner and more flexible than the undrawn quadrilaterals and greatly improve the drapability of the fabric whether it be a non-woven fibrous web or an extruded film. The drawn areas are much stronger than a web of undrawn material of the same thickness even though many substantially undrawn quadrilateral areas are dispersed or distributed throughout the web. A drawable force applied to the web will draw these areas before the web is ruptured.

Feeding the web or film through two or more pairs of meshing rollers in accordance with the invention forms substantially undrawn quadrilateral islands bounded on each of their four sides by drawn areas. All drawn areas form generally straight lines paralleling each other and superimposed on the first set is a second set at an angle crossing the first set leaving the substantially undrawn quadrilateral islands also in rows and forming a quilt like pattern. The drawn areas form straight lines made up of alternating areas of axially drawn and biaxially drawn areas.

The partially drawn or undrawn quadrilateral islands are in rows which can be formed in any direction across the web, from being parallel to the machine direction axis of the web or parallel to a line normal to the machine direction axis of the web. Any number of sets of superimposed grids or patterns can be created with each set in turn reducing the size of the previously formed undrawn quadrilateral islands. Since the substantially undrawn islands are in rows and alternating positions with axially or biaxially drawn areas, a force or forces applied to the web, if large enough, will start to draw the undrawn islands and then continue to the next row in succession until the force or forces are dissipated.

Involute or cycloidal tooth forms are preferred to accomplish the quilt-like drawing process of the invention. These types of gear tooth forms have a line of action in which more than one tooth is in contact with the intervening web at the same time. It is along the gear line of action that two types of grip zones facilitate localized drawing. The first grip zone is between a corner of the tooth and the base of its mating tooth. The second grip zone is between the faces of two mating teeth, with a third grip zone in the corners of the incoming teeth. A fourth grip zone is formed by having film under tension contacting the tops of the gear teeth whether they have sharp corners or are rounded completely. The grip zone as used in this application means a zone, whether it be a line or an area that restricts the movement of a web or webbed surface to such a degree that drawing or orienting takes place in areas of parallel relationship to drawn or partially drawn areas between grip zones.

A rounded tooth form or sine wave form will have its grip zone located at the top of the tooth. The film tension presses the film against the top of the tooth and this additional friction is enough to not allow the film to be drawn on the contact area at the top of the teeth, but only between the tops of two or more mating teeth. However, if the tooth depth were exceptionally deep with respect to the tooth spacing, the needed material for drawing while teeth were entering tooth spaces would slip from the top of the tooth. However, drawing would not start at the top of the teeth, but between them.

The shape of the teeth determine the amount of incremental drawing which takes place. Sharper corners allow less slippage and produce a higher incremental draw. That is, highly drawn lines or areas separated by less drawn or undrawn line or areas. The clearance at the sides of the teeth can be varied from a low clearance, which squeezes the web (in this case larger radii at the corners can be used) to a high clearance with no squeezing action of the web. In the later case sharper corners will produce effective draw.

The depths of the grooves and/or teeth depend upon or are related to the thickness of the web. The tooth height has to be large enough so that the web will be stretched and not crushed or embossed.

Drawing of webs as disclosed herein with spaced apart undrawn areas produces a web with high tensile strength and good softness and drapability which makes it usable in a wide variety of products.

Further objects, advantages and features of the invention will become apparent from the following disclosure.

DESCRIPTION OF THE DRAWINGS

FIG. 1 is a diagrammatic perspective of apparatus to practice the invention.

FIG. 2 is a diagrammatic plan view of a fragmentary portion of a web after having been run through the first set of helical-rollers shown in FIG. 1.

FIG. 3 is a diagrammatic front elevational view of the first set of rollers shown in FIG. 1.

FIG. 4 is a front elevational view of a modified form of helical-toothed stretching rollers for practicing the invention.

FIG. 5 is a front elevational view of modified form of stretching rollers for practicing the invention.

FIG. 6 is a front elevational view of a further pair of stretching rollers.

FIG. 7 is an enlarged fragmentary cross-sectional view showing the meshing teeth of two helical-toothed stretching rollers of this invention with a length of web being incrementally gripped and stretched between the meshing teeth of the two stretching rollers.

FIG. 8 is a diagrammatic cross-sectional view of a helical-toothed stretching roller having a resilient cylinder pressed against the teeth thereof to cause incremental gripping and stretching of a web running between the teeth of the stretching roller and the surface of the resilient roller.

FIG. 9 is a fragmentary cross-sectional view of the meshing teeth of two helical-toothed stretching rollers on which the corners of the teeth are rounded.

FIG. 10 is an enlarged diagrammatic view of a portion of the stretched and crimped web.

FIG. 11 is an enlarged view showing the strands of a melt-blown or spun-bonded web before the web is incrementally gripped and stretched in accordance with the method of this invention.

FIG. 12 is an enlarged view of the web shown in FIG. 11 after it has been incrementally gripped and stretched in accordance with the method of this invention.

FIG. 13 is diagrammatic view showing a helical-toothed stretching roller and illustrating how strands which are disposed at differing angles to the teeth of the stretching roller are stretched by differing amounts according to their angular orientation.

FIG. 16 is a diagram of test apparatus.

FIG. 17 is an enlarged schematic view showing the interaction between the web and meshing teeth of gears used to practice the invention.

FIG. 18 is a fragmentary enlarged view of the meshing gear teeth shown in FIG. 17.

FIG. 19 is a schematic diagram indicating draw axes X and Y and machine direction during drawing.

FIG. 20 is an enlarged view of a portion of a web drawn along the X axis only.

FIG. 21 is an enlarged view similar to FIG. 20 of a web drawn along the X and Y axes.

FIG. 26 is an enlarged view of a web processed through 3 sets of rollers with each set having a different helix angle.

DESCRIPTION OF THE PREFERRED EMBODIMENTS

Figure 14:
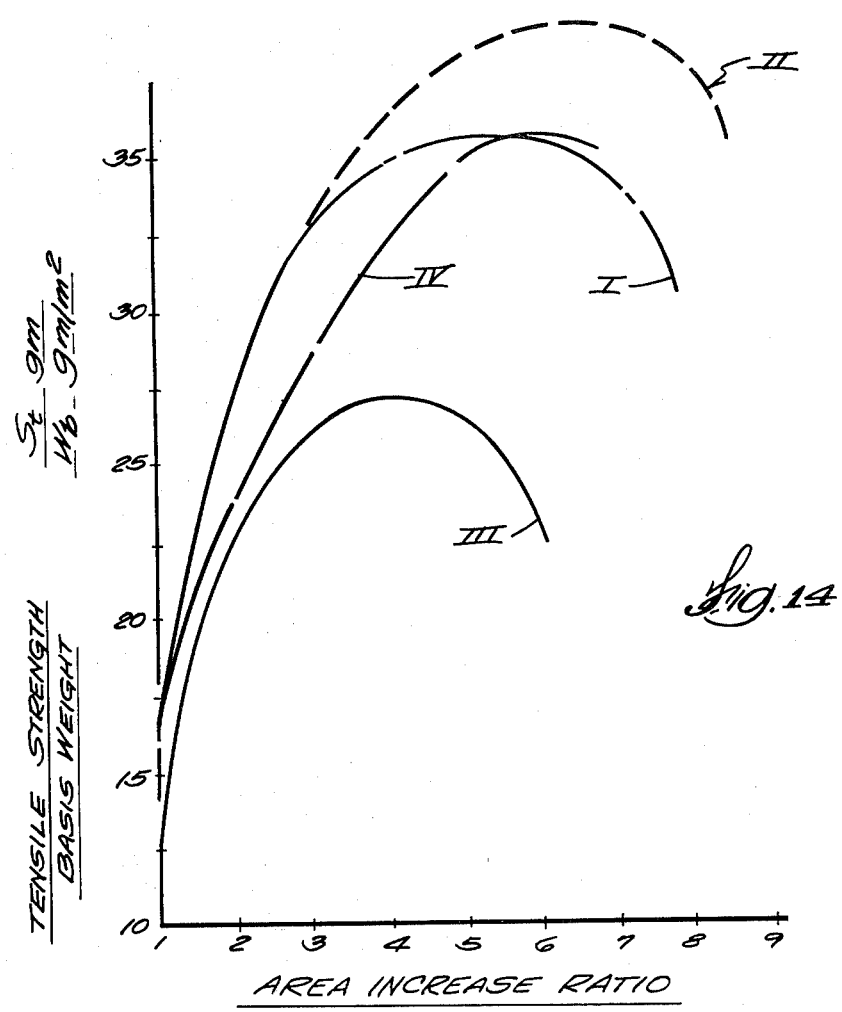
FIG. 14 is a set of curves showing the relationship between the tensile strength ratio of a group of melt-blown or spun-bonded fabrics and the area increase ratio thereof.

Although the disclosure hereof is detailed and exact to enable those skilled in the art to practice the invention, the physical embodiments herein disclosed merely exemplify the invention which may be embodied in other specific structures. The scope of the invention is defined in the claims appended hereto.

The first step of the method of this invention is to provide a preliminary fibrous web which is composed at least in part of cold drawable strands. As shown in FIG. 1, this may be done by making a spun-bonded or melt-blown web 10 with a spinneret head 12 having one or more rows of spinnerets 14 which deposit a web of molten synthetic resin strands onto a moving collecting cylinder 16, the melt-blown strands being oriented randomly on the surface where they strike the collecting cylinder 16 to form a spun-bonded or melt-blown web 10 as well known in the prior art. A film, singly or in combination with other webs or films, can be provided in this step. Alternately, any other suitable means may be utilized to provide a preliminary fibrous web which is composed at least in part of cold drawable strands, e.g. carding, air laying, spun bonding, or electrostatic deposition.

The second step of the method of this invention is to incrementally grip the web 10 along spaced parallel grip zones that are relatively close together compared to the width of the web, and the third step is to incrementally stretch the web along spaced parallel stretch zones between the grip zones. The phrase "incrementally grip the web" means to grip the web along a relatively small area or increment thereof, and the phrase "incrementally stretch the web" means to stretch the web along a relatively small area or increment thereof. One illustrative way of incrementally gripping and incrementally stretching the web 10 is to pass it between at least one pair of helical-toothed stretching rollers 18 and 20 (FIG. 1) which having meshing teeth 21 and 22 (FIG. 7) with corners 23–24 and 25–26. As the web 10 engages teeth 21 and 22, it is first incrementally gripped at 27 and 28 by tooth corners 26 and 23 and is incrementally stretched between 27 and 28 as the teeth 21 and 22 rotate. Tooth corners 23–24 and 25–26 are preferably rounded so that they do not cut or weaken the strands of web 10. The amount of rounding or the size of the radius on the tooth corners 23–26 will determine the location and the width of the grip zones and the stretch zones. As the radius of rounding is increased, there is more sliding of the web over the tooth corners 23–26 as the teeth move into mesh. As the corner radius is increased, the incremental gripping or grip zones become wider.

As the teeth 21 and 22 rotate, the web 10 is stretched between points 29 and 30, with a lesser amount of stretching occurring between points 28 and 29 depending on the degree of rounding at corners 23–26 as discussed above. At point 31 the web 10 will be squeezed and flattened, the amount being determined by the amount of side clearance of the teeth. The action of the teeth on the web will be subsequently described in detail.

FIG. 11 is an enlarged view of the individual strands 34 of a melt-blown or spun-bonded web before it is incrementally gripped and stretched in accordance with this invention, and FIG. 12 shows its appearance after being incrementally gripped and stretched. As shown in FIG. 12, the individual strands 34 of web 10 may be slightly flattened as indicated at 36 from being squeezed, and are necked down as indicated at 38 by virtue of having been stretched between the adjacent grip zones. In the regions 38 where the individual strands are stretched, their strength is increased by the well-known effect of molecular orientation of the molecules of the strands which occurs during the stretching process. When flattening of the strands occurs as shown at 36, this increases the flexibility of the strands and thus enhances the softness and drapability of the web. In addition, flattening of the strands also increases the uniformity of the web, since the thicker portions of the web get flattened more than the thinner portions due to the fact that both are acted upon by the same clearance between the meshing teeth 22 and 24. However, some thermoplastic resins are more resilient than others or have a greater plastic memory and, after squeezing or flattening, will tend to return to their original shape or form. With strands made from these materials there will be little or no flattening depending on the amount of tooth clearance.

The amount of drawing and necking down of the individual strands 34 depends upon the angle that the strands 34 make with the teeth of the stretching rollers in the stretch zones. This is illustrated diagrammatically in FIG. 13 wherein a stretching roller 40 having helical teeth 42 is shown with a group of strands A through I laid at differing angles across the surface of the teeth 42. The strand D which is perpendicular to the teeth 42 would receive the maximum stretching in the stretch zones thereof. The strands E, F, and G would receive diminishing amounts of stretching, and the strand H would not be stretched at all by the teeth 42 since it lies parallel to these teeth. However, if the web 10 is fed through two sets of stretching teeth which are oriented at an angle of 90° to each other, then the second set of stretching teeth would produce a maximum stretching for the strand H and a minimum stretching for the strand D. Thus the use of two sets of helical-toothed stretching rollers which have teeth oriented at 90° to each other produces an approximately equal amount of stretching in all of the strands of the stretched web regardless of their angle with respect to the longitudinal axis of the web.

As the web 10 is being incrementally gripped and stretched, it is also crimped into a corrugated cross-section as shown in FIG. 10, resulting in a web having undrawn or partially drawn areas or filaments.

Although the strands 34 in the web 10 are shown in FIGS. 11 and 12 as being oriented at random angles to the axis of the web, this is not necessary in the method of the invention. The individual strands 34 can be primarily oriented along the longitudinal axis of the web if desired or primarily oriented along any other suitable angle with respect to the longitudinal axis of the web. Another example of the suitable web fiber orientation would be to orient half of the fibers at an angle of 45° to the longitudinal axis of the web and to orient the other half of the fibers predominantly at an angle of 135° to the longitudinal axis of the web.

The method of this invention is not limited to use of meshing helical-toothed stretching rollers such as illustrated in FIG. 7. A single helical-toothed stretching roller 44 (FIG. 8) may be used in combination with a cylindrical resilient roller 46 which presses against a web 48 that runs between the roller 46 and roller 44, the resilient roller 46 being pressed against web 48 and roller 44 with sufficient force to deform the roller 46 opposite the teeth of roller 44 so that the web 48 is incrementally gripped and stretched along grip zones and stretch zones similar to those produced by the meshing teeth shown in FIG. 7.

FIG. 9 shows a tooth configuration that is more rounded than those shown in FIG. 7. In this configuration, teeth 50 and 52 are equally rounded on their upper and lower corners. As you approach the sine wave form with the FIG. 9 configuration, the increase in center to center distance of the gears greatly increases the side clearance distance faster than the involute form thereby reducing the desired flattening of the fibers as with the FIG. 7 tooth shape.

The stretching rollers 18 and 20 (FIG. 3) in this particular example each have four sets of meshed parallel helical teeth 54 through 60 and 62 through 70 which are disposed in a herringbone pattern in which the teeth of each set of teeth are inclined at an angle to the ends of the roller and to the teeth of adjacent sets. In each set of teeth 54 through 70, the individual teeth of the set are helical in form and are each disposed at a helix angle A to the end of the corresponding roller and are disposed at an angle B to the teeth of the adjacent set. Angle B is equal to twice angle A. The angle A may be any desired acute angle and is chosen by consideration of the desired ratio between the elongation of the web 10 in the longitudinal dimension and its elongation in the lateral dimension. When the angle A equals 45°, the longitudinal elongation of web 10 is approximately equal to the lateral elongation thereof. When the angle A is greater than 45°, the longitudinal elongation of web 10 exceeds the lateral elongation thereof. When the angle A is less than 45°, the lateral elongation of web 10 exceeds the longitudinal elongation thereof. The lateral elongation is approximately equal to the longitudinal elongation multiplied by the tangent of A.

In the particular example shown in FIGS. 1 and 3, the stretching rollers 18 and 20 impress a balanced herringbone pattern on web 10 as shown diagrammatically in FIG. 2. (A more detailed analysis of the pattern is subsequently described.) In this case, the individual sets of teeth 54 through 70 are equal in width and are each disposed at the same angle A to the end of the corresponding roller 18 or 20. However, it is not necessary for the sets of teeth 54 through 70 to all have the same width. FIG. 4 shows a second pair of stretching rollers 72 and 74 with sets of teeth 76 through 94 in which the individual sets of teeth have differing widths. In this example, all of the teeth have a helix angle D with respect to the end of the corresponding roller and are disposed at an angle E to the teeth of the adjacent set. Angle E is equal to twice angle D. Although the sets of teeth may have different widths, the teeth themselves are preferably of the same size and have the same helix angle to avoid setting up differential stresses that might tend to tear the web therebetween.

The stretching roller of this invention may have only one set of helical teeth as shown in FIGS. 5 and 6. In FIG. 5, rollers 91 and 93 have a helix angle which is shallower than that shown in FIG. 3, while in FIG. 6, rollers 95 and 97 have a helix angle close to zero degrees.

In the embodiment of the apparatus shown in FIG. 1, after web 10 is stretched by passage through stretching rollers 18 and 20, it is stretched a second time by passage through similar stretching rollers 96 and 98, which contain helical teeth that are oriented at 90° to the teeth of rollers 18 and 20, thereby changing the herringbone pattern of web 10 into a quilted pattern of quadrilaterals or diamond shapes. The diamond-patterned web is thereafter smoothed by calendering rollers 100 and 102 which may be heated to help smooth out the corrugations in the stretched web 10. The calendering rollers 100 and 102 do not necessarily remove the corrugations in the diamond-patterned corrugated web but may merely reduce the height of the corrugations and smooth the tops thereof. The quilt pattern in FIG. 2 is a generalized representation of the resulting pattern. The actual pattern produced by one set of rollers is illustrated in FIG. 2. This was after going through only one set of rollers.

It appears desirable in practice to use even numbers of sets of stretching rollers, e.g. 2, 4, 6, 8, etc. to provide a balanced pattern on the resulting stretched web.

In the particular apparatus illustrated in FIG. 1, the stretching rollers 96 and 98 are driven at higher speed than the stretching rollers 18 and 20 to take up the longitudinal elongation of web 10 due to rollers 18 and 20, and the calendering rollers 100 and 102 are driven at a higher speed than the stretching rollers 96 and 98 to take up the elongation of web 10 due to rollers 96 and 98. The above-noted difference of speed depends upon the amount of longitudinal elongation of the rollers 18 and 20 and 96 and 98, which in turn depends upon the helix angles thereof as described above. The helix angles may have any desired value between 0 degrees and 90 degrees.

The total amount of area stretching can be increased appreciably by repeated incremental stretching of the fabric. The term "area stretching" includes the total area of the web which as subsequently described includes undrawn islands, axially and biaxially stretched areas.

As shown in the curves in FIG. 14, repeated stretching of the fabric tends to increase its strength ratio up to a maximum point which occurs when the area increase ratio $R_a$ of the fabric is in the neighborhood of 4 to 6, the area increase ratio being defined as the stretched area of the web divided by the initial area of the web. In other words, an area increase ratio $R_a$ of 4 indicates that the area of the web has been increased by 400% by repeated stretching operations. In the curve shown in FIG. 14, Sample No. I had a starting basis weight of 130 gm/M$^2$, Sample II had a starting basis weight of 220 gm/M$^2$, Sample III had a starting basis weight of 150 gm/M$^2$, and Sample IV had a starting basis weight of 201 gm/M$^2$. The tensile strength for all of the samples is given in tensile strength $S_t$ in grams divided by basis weight $W_b$ in grams per M$^2$. The repeated drawing of the web through the stretching rollers not only increases its tensile strength to basis weight ratio, as shown in the chart of FIG. 14, but it also increases the uniformity of the web since the thickened areas of the web are flattened and drawn more than the thinner areas of the web and thus the blotchiness and streakiness of the web is substantially decreased as it is repeatedly drawn in accordance with the process of this invention. The repeated gripping, crimping, and stretching also greatly enhances the softness, bulk, texture, drapability, and uniformity of the web.

Figure 15:
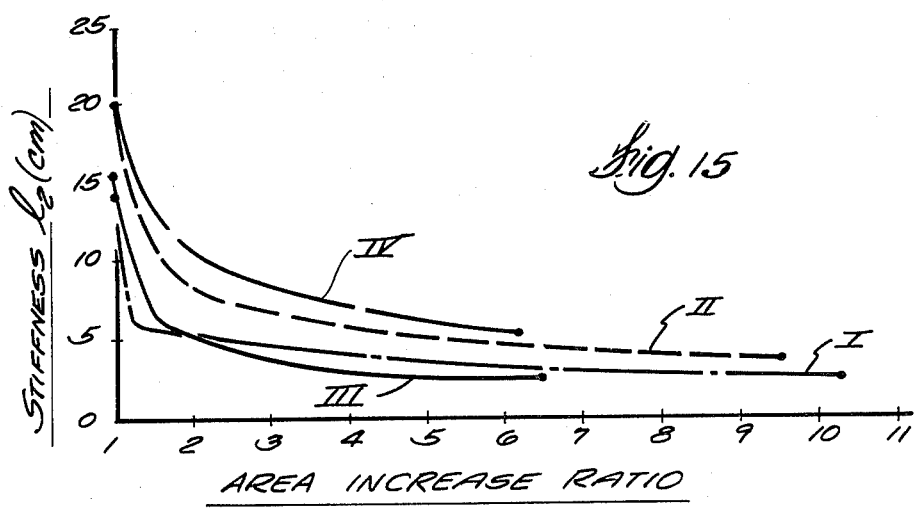
FIG. 15 is a set of curves showing the relationship between the stiffness of a group of melt-blown or spun-bonded fabrics and the area increase ratio thereof.

FIG. 15 shows the curves of stiffness versus area increase ratio for the four samples disclosed above in the graph of FIG. 14. The stiffness of the fabric is measured in terms of the length $L_2$ at which the natural weight of the web will draw the web down from a standard initial height. The end of the web is pushed off a block (FIG. 16) and the distance $L_2$ from the point of beginning of the left end of the web shown in broken lines to the terminal point shown in solid lines is measured. The terminal point is located by moving the web toward and over the ramp until the right end of the web sags under its own weight and engages the ramp as shown. Thus the greater the length $L_2$, the stiffer the web, and the smaller the length $L_2$, the softer the web. As can be seen by the curves in FIG. 15, the stiffness decreases quite substantially after the initial drawing of the web but does not increase at a very substantial rate on subsequent drawing of the web.

In order to obtain the maximum advantages of the invention, various parameters of the gears and web thickness must be considered. The circular pitch of the gear should be less than the product of the thickness of the web being processed times one hundred. For instance, if the web thickness is 0.005 inches, the circular pitch should be less than 0.5 inches. With a circular pitch greater than this relationship, the web can be torn apart and large undrawn islands spaced far apart result with less uniform drawing. An involute gear arrangement which has provided good results has the following characteristics:

64 Diametral Pitch Gear
14½ degree gear pressure angle
Outside diameter 6.594 inches
297 full depth teeth
45° spiral right hand
45° spiral left hand
Addendum 0.015625 inches
Dedendum 0.015625 inches
Working depth 0.03125 inches
Tooth thickness 0.0245 inches
Pitch line 0.0245 inches
Minimum bottom clearance 0.002453 inches
Circular pitch 0.0491 inches The tooth side clearance between the meshing gears for webs of different thickness can be varied by changing the center to center distance of the gears. The equation relating bottom clearance to side clearance is as follows:

$C_B$ = Bottom Clearance
$C_S$ = Side Clearance
$C_{BO}$ = Minimum Bottom Clearance
$\phi$ = Pressure Angle
$C_S = [C_B - C_{BO}][SIN \phi]$ Involute gears with teeth having pressure angles of 14½°, 20° and 25° provide good results.

FIG. 17 illustrates an enlarged view of the stretching and squeezing which occurs in a web as it passes between two rotating-toothed rollers. In FIG. 17, gears 150, 152 have a diametral pitch of 64, a pitch diameter of 6.56275 inches, and a pressure angle 14½ degrees. The film or web 154 has an initial thickness of 0.004 inches. The web 154 is moved in the direction of the arrow 156 and the gears 150, 152 are rotating in the direction shown. The web 154 has not heretofore been run through stretching rollers. Where the tooth tops 158 (FIG. 17) meet the web, no stretching occurs and you obtain undrawn bands or zones 160 as illustrated in FIG. 20, where the bands 160 are drawn in the direction of the axis. The illustration in FIG. 19 shows the portion of a web 161 illustrated in FIGS. 20, 21, 22, 23, in its relationship to the machine direction or direction of web movement and two draw axes X and Y. The draw axis X is perpendicular to the tooth tops of the first set of draw rollers such as illustrated in FIG. 5 and the draw axis Y is perpendicular to the second set of draw rollers similar to those in FIG. 5 wherein the first set of rollers draws the web along the axis and the second set draws the web along the Y axis. The zones 162 between the unstretched bands 158 become progressively stretched and increased in length as the web traverses the action or contact zone between the teeth 150, 152. Thus, the stretch band 162 at the left of FIG. 17, has obtained maximum stretching for one pass through the gears. As it is also illustrated in FIG. 20, the stretch bands 162 alternate with the undrawn bands 160.

FIG. 18, an enlarged view of a portion of FIG. 17, illustrates the stretch bands 162 in between the undrawn bands 160. Where the film thickness is large in relation to tooth height, there are grip zones 166 between the teeth of the opposed gears 150, 152. In the grip zones 166 squeezing of the web occurs.

FIG. 21 illustrates the web shown in FIG. 20 after it has also been drawn along the Y axis by passing through one additional set of rollers to form undrawn islands 170. The islands 170 are bounded on each of their four sides by mono-axially drawn zones 172, 174, 176 and 178, with the quadrilateral islands being contiguous at each of its four apices to biaxially drawn areas 180, 182, 184, and 186. The undrawn bands 160 resulting from one pass through the helical rollers as shown in FIG. 20 are thus provided with a superposed pattern at 90 degrees which provides the mono-axially and biaxially zones surrounding the undrawn island. The drawn bands 162 are broken up into alternating biaxially and mono-axially stretched quadrilaterals.

Figure 22:
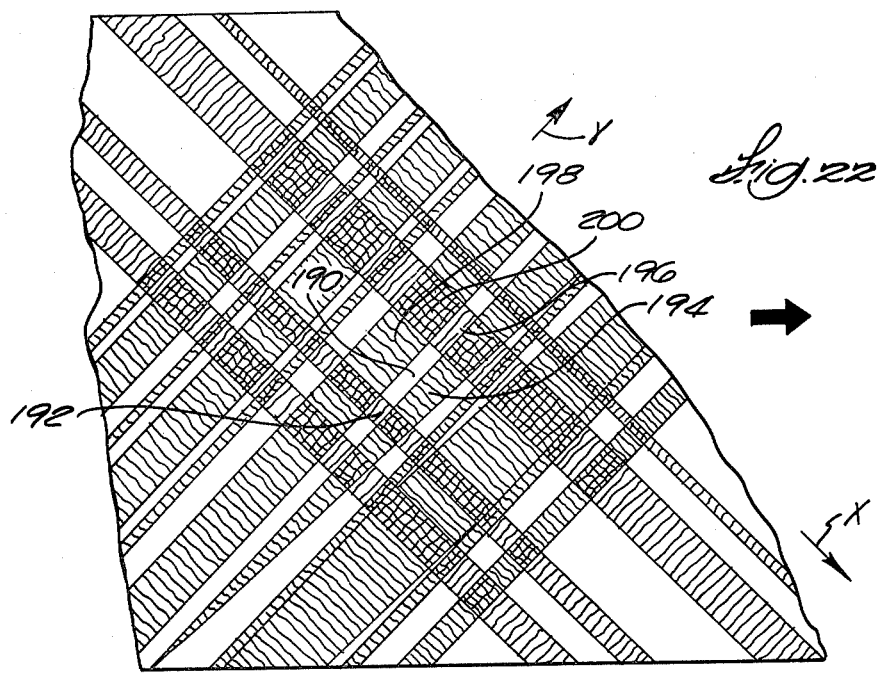
FIG. 22 is an enlarged view similar to FIG. 20 of a web drawn twice along the X axis and once along the Y axis.

FIG. 22 shows the web, FIG. 21, after it passes through an additional set of gears to draw the web a second time along the X axis. The undrawn islands 190 have been reduced in area and the drawn areas have increased. The undrawn island 190 is bounded on its four sides by mono-axially drawn zones 192, 194, 196 and 198 and contiguous at its apices with biaxially drawn zones 200.

Figure 23:
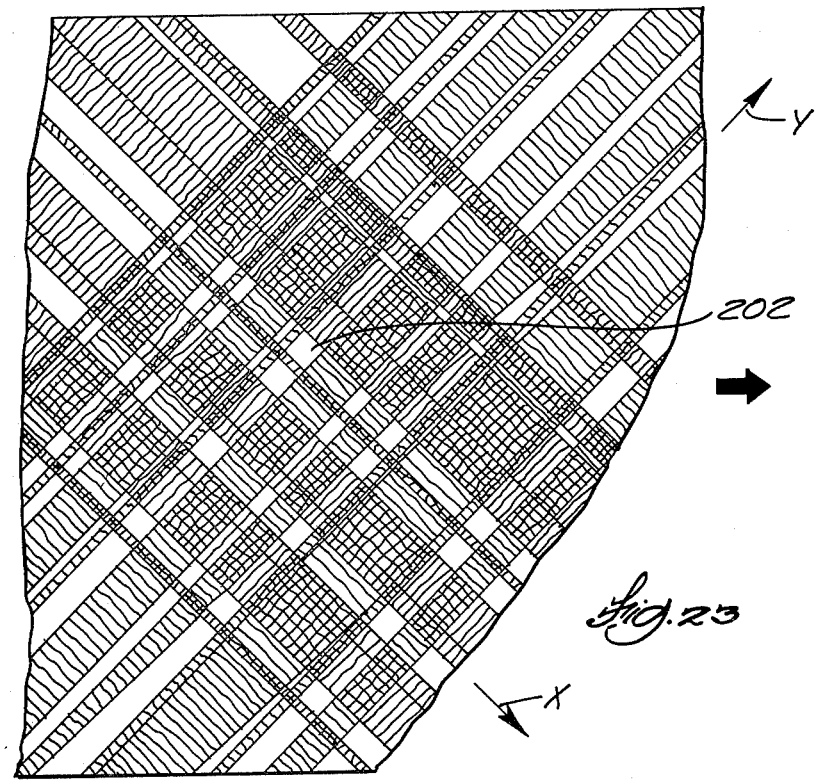
FIG. 23 is an enlarged view similar to FIG. 20 of a web drawn twice in the X direction and twice in the Y direction.

FIG. 23 illustrates the web as shown in FIG. 22 after it has gone through a second pass with stretching along the Y axis. The undrawn island 202 has been further reduced in size and is still surrounded on the four sides by mono-axially drawn zones and contiguous at its apices with multi or biaxially drawn zones. The FIGS. 20, 21, 22 and 23 are graphic representations of photomicrographs of webs taken with polarized light, which provides different colorations due to different molecular orientations thus undrawn, mono-axially drawn and biaxially drawn zones are visible and the quilt-like pattern readily observable. The area of the web is substantially increased by the progressive passes through the gears illustrated in FIGS. 20 through 23.

Tooth forms having a line of action such as involute and cycloidal, are much more effective with or without rounded corners than a sinusoidal tooth form which has its minimum clearance at the roll axis centerline and an increasing clearance as it recedes and a decreasing clearance as it nears or approaches this centerline. It has been found that the best tooth form is one which has a tooth side clearance with approximate uniformity along a line of action for more than one tooth, the involute form being preferred. Pressure angles can vary from 5° to 40°; 14½° to 25° being preferred.

After drawing with first and second pairs of meshing toothed rollers the substantially undrawn quadrilateral areas, axially drawn and biaxially drawn areas are fairly uniform in that substantially all areas are quadrilaterals although there are variations in size and shape. After a third and fourth pass some of the substantially undrawn quadrilaterals begin to break up; that is, portions of them are drawn resulting in one quadrilateral area becoming two or more quadrilaterals of undrawn areas. This is also true of the axially, biaxially and multi-axially areas.

Although the shapes of the drawn and undrawn areas are generally in various configurations such as diamonds, rhombuses, parallelograms, squares, etc. (quadrilaterals) resulting from drawing along two transverse axes the corners of the quadrilaterals are often rounded. When the quadrilaterals are small, the rounded corners cause the islands to appear somewhat elliptical.

The equipment used to practice the process, more specifically the characteristics of the gears in relation to thickness of the web to be processed involve a number of variables which can be selected for optimum results and for the particular properties desired of the processed web. Gears having a diametral pitch of 24, 30, 48, and 64 which are practical diametral pitches for process purposes were used with different tooth heights and film thicknesses to determine the optimum web thickness for certain tooth heights and practical ranges of tooth heights.

The table I illustrates tests with gear sets having diametral pitches of 64, 48, 30 and 24. Various film thicknesses were tested. The study was conducted to determine the relationship between tooth height and original film thickness to obtain maximum tensile strength.

Table I

All Gears
Outside Diameters = 6⅝"; Helix Angle = 45°
Pressure Angle = 14½°

FULL INVOLUTE TEETH

| Diametral Pitch | Tooth Height | Film Thickness | Relative Tooth Height | Maximum Tensile Strength Increase Ratio |
|---|---|---|---|---|
| 64 I | .03125" | .00237" | 13.18 | 1.85 |
| 64 III | .03125" | .00286" | 10.93 | 1.65 |
| 64 V | .03125" | .00495" | 6.31 | 1.72 |
| 64 VII | .03125" | .00995" | 3.14 | 1.56 |
| 48 II | .04166" | .00237" | 17.58 | 1.65 |
| 48 IV | .04166" | .00286" | 14.57 | 1.95 |
| 48 VI | .04166" | .00495" | 8.42 | 1.73 |
| 48 XVI | .04166" | .00995" | 4.18 | 1.90 |
| 30 VII | .06667" | .00237" | 28.13 | 1.50 |
| 30 XIII | .06667" | .00286" | 23.31 | 1.35 |
| 30 IX | .06667" | .00495" | 13.46 | 1.37 |
| 30 X | .06667" | .00690" | 9.66 | 1.97 |
| 30 XI | .06667" | .00995" | 6.70 | 2.10 |
| 30 XV | .06667" | .01275" | 5.23 | 2.15 |
| 24 XII | .08333" | .00286" | 29.13 | 1.22 |
| 24 XIII | .08333" | .00495" | 16.8 | 1.38 |
| 24 XIV | .08333" | .01275" | 6.54 | 2.33 |

Table II

| Diametral Pitch | Optimum Relative Tooth Height | Practical Relative Tooth Height Range |
|---|---|---|
| 64 | 13 | 8-18 |
| 48 | 10 | 5-15 |
| 30 | 8 | 4-14 |
| 24 | 7½ | 4-14 |

Figure 24:
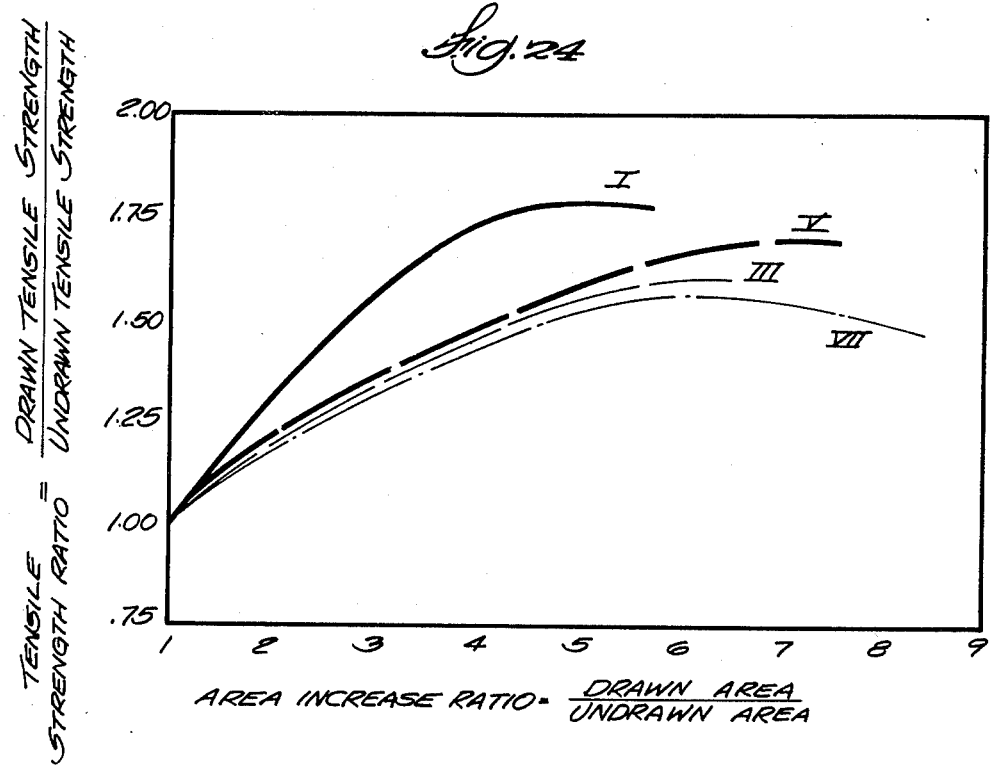
FIG. 24 shows curves of tensile strength ratio vs. area increase ratio for four sets of gears having a 64 diametral pitch.

FIG. 24 illustrates curves I., III, V and VII of one tooth height namely, 0.03125 inches with different film thicknesses. Curve I is a plot of tensile strength ratio which is equal to the drawn tensile strength over the undrawn tensile strength versus area increase ratio which is drawn area over undrawn area. The maximum tensile strength increase ratio illustrated in FIG. 24 is 1.85. The gear set I had a relative tooth height of 13.18 which is equal to the tooth height 0.03125 divided by original film thickness 0.00237. The other 64 diametral pitch gears provided lesser increases in tensile strength.

Figure 25:
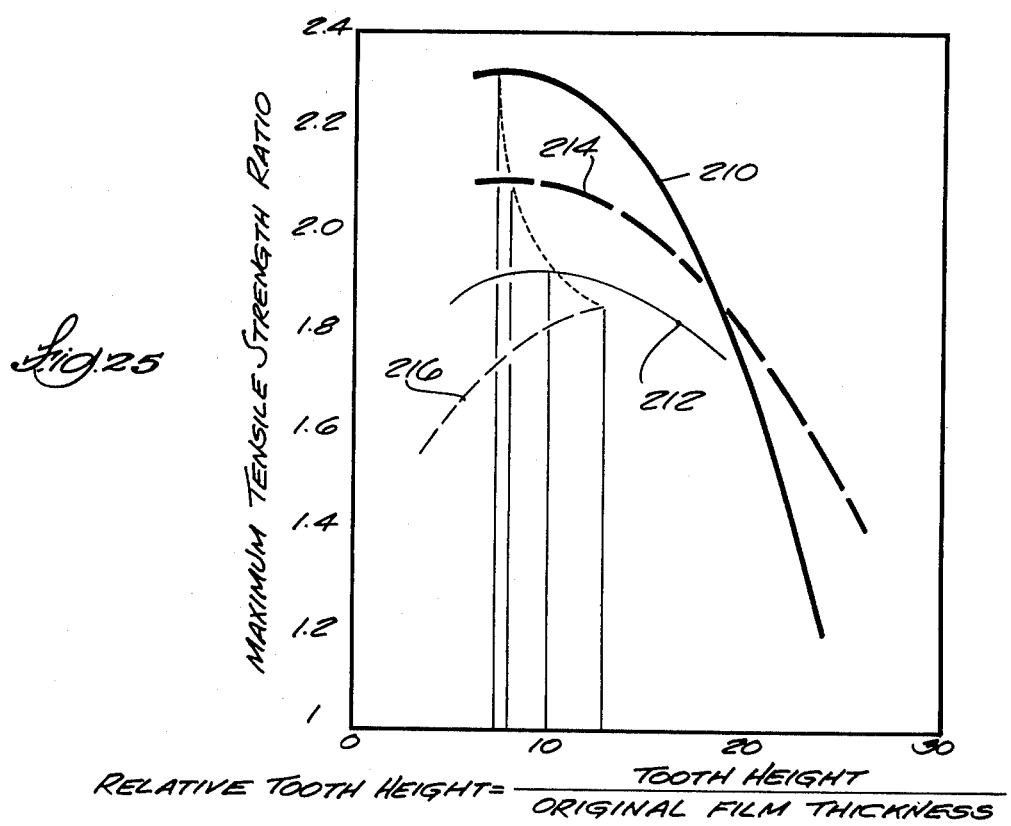
FIG. 25 shows curves of maximum tensile strength ratio vs. relative tooth height for gears with different diametral pitches and tooth height.

FIG. 25 is a plot of curves of maximum tensile strength ratios versus relative tooth height for the gear sets in Table I. Curves for each set of gears for the various diametral pitches in Table I were prepared to find the maximum tensile strength ratios similar to FIG. 24 which contains only the curves for the 64 diametral pitch gears. The curve 210 is for 24 diametral pitch gears, curve 212 for 48 diametral pitch gears, 214 for 30 diametral pitch gears and 216 for 64 diametral pitch.The curve 218 is the curve of optimum points for all curves. The peaks for the curves of tensile strength ratio versus area increase ratio are plotted on FIG. 25. The curves on FIG. 25 indicate that the optimum relative tooth height is between 7½ and 13. The practical relative tooth range is 5 to 15.

Thus, where maximum tensile strength of the web is the desired property sought, the tooth height can be selected for a particular film thickness.

Tests were also run to determine the effect of varying the diametral pitch of gears in a series of sets of gears where multiple draws are to take place. It was found that reducing the tooth height in the succeeding sets of gears did not substantially improve the strength ratio as compared with running the web or film through a succession of gear sets having the same diametral pitch. For instance, in one test a film with an original thickness of 0.006 inches went through four passes of gear sets with 30 diametral pitch, two passes with 48 diametral pitch and four passes with 64 diametral pitch, the resulting tensile strength ratio was 1.63. For the same film thickness, drawn with a similar number of passes with all gears having a 30 diametral pitch, the tensile strength ratio was 1.80 and thus, better than with the varying diametral pitches. In other tests there was no substantial variance in the strength increase ratio whether diametral pitch was varied for each successive set of rollers or remained the same.

In addition to consideration of tooth height, the diameter of the rollers should be considered. With large diameter rollers or gears the length of the contact zone of the web with the teeth is longer and since the incremental stretching takes place over a larger number of teeth simultaneously, the peripheral velocity of the rolls can be increased. If the teeth are at a helix angle, they engage or mesh gradually rather than suddenly as they do if they are parallel to the axis of the roll. Thus, with helical gears, the peripheral velocity of the rolls can be greater than with spur gears. With a 72 tooth gear and 64 diametral pitch, the minimum practical diameter is considered to be 1.125 inches. With gears having a 48 diametral pitch and 72 teeth the minimum diameter would be 1.5 inches. With a 30 diametral pitch gear and 72 teeth the minimum diameter would be 2.4 inches. With a 24 diametral pitch and 72 teeth, the minimum diameter would be 3 inches. Gears having a diameter of 6⅝ inches have provided good results.

The corrugations in the crimped web produce a rough finish which is useful for wiping, cleaning, and scrubbing operations, especially when a layer of absorbent fibers are sandwiched between two melt-blown layers.

The squeezing action of meshing tooth forms flattens the thicker cross-over points of the individual strands, making them more flexible. Drawing of the individual strands lengthens the distance between self-bonded cross-over points. This lengthening of the distance between self-bonded cross-over points in turn reduces the stiffness by having increased distances over which flattened, distorted, and/or drawn or partially drawn strands can slide over one another, thereby increasing the drapability and duplicating cloth in feel and textures.

Stretching the web strands over meshing tooth forms of the appropriate size in many small increments orients strands along portions of their lengths while forming convolutions or corrugations around the tooth forms. After one or more passes, the convoluted or corrugated strands being to act like knuckles in woven fabrics which are formed between the warp and weft or woof in the loom. These convolutions or simulated knuckles allow individual strands to slip and slide between one another between bonded cross-over points, thereby substantially decreasing the stiffness, increasing the drapability, increasing the bulk, increasing the area, and increasing the smoothness to feel when calendered, in addition to increasing the uniformity and strength of the fabric.

A particularly useful high-loft fabric for use on diapers, bed pads, dressings, and the like is produced by making a laminate of two layers of melt-blown fibers separated by a layer of absorbent fibers such as wood pulp, cotton linters, cotton, etc. and passing the laminate between one or more pairs of meshing toothed stretching rollers followed by calendering at least one side to a smooth, non-abrading surface for contact against the skin. A suitable low-cost laminate can be made with one of the two layers of melt-blown fabric being replaced with a water-impervious layer such as polyethylene film, polypropylene film, or the like. In the case of laminates with melt-blown webs and undrawable absorbent fibers, unique properties and/or physical characteristics are obtained by first depositing molten tacky filament on both sides or at least one side of a layer of airlaid pulp fibers or a sheet of absorbent toweling. As this web is passed through a pair of meshed toothed draw rolls, the drawable thermoplastic strands are stretched while the undrawable absorbent fibers are separated or broken in the first pass into weakened lines, then with further passes into weakened diamond-shaped areas, and finally diamond-shaped clumps of absorbent fibers separated by lines of drawn strands. The molten strands in their deposition on wood pulp fibers were bonded to quantities of these fibers and still remain bonded to a portion of them. This laminate can be thru-bonded or spray-bonded on one or both sides to strengthen the web and prevent fiber dusting.

A web containing stretched and unstretched strands which are intermittently stretched in varying degrees is yieldable when subject to varying stresses in use. This quality allows the web to stretch, conform, or yield to use stresses rather than to rupture or tear.

Although many types of tooth forms can be used for the incremental stretching of this invention, such as corrugated rollers of the rounded tooth form and many others, the preferred type is of either the involute or cycloidal gear tooth form because of the rolling tooth contact action in use and because of the ease of manufacture by use of a standard gear cutter and the ability of involute or cycloidal tooth forms to squeeze the strands of the web between the sides of the teeth yet maintain rolling contact against the strands with a minimum of abrading.

The use of helical-toothed stretching rollers with a stretching force at an angle has the advantage of force factors in lateral and longitudinal directions as well as the angular force factor resulting in an increase in all dimensions of the web in two passes. This multiple incremental drawing produces a uniform stretch both laterally and longitudinally in addition to the angular stretch despite variations in fiber deposition in the web and weak or high-strength areas in the web. All areas of the web are stretched uniformly regardless of their physical properties because of the incremental gripping action of the meshing teeth.

All pairs of meshing stretching rollers can have the same tooth size and form or can have varying sizes and forms, e.g. the first pair could have larger or coarser teeth followed by pairs with smaller or finer teeth as the web is stretched wider and longer with a corresponding decrease in web thickness.

If the stretching rollers are spaced apart with sufficient clearance, the incremental stretching will take place with little or no squeezing or flattening of the individual strands. However, it will take additional passes to produce the same area increase as produced when the rolls are spaced close enough together to produce stretched strands with squeezed flattened areas or segments of strands.

The physical deposition of molten strands can be varied to produce varying properties in the final web. If the melt-blown strands are deposited in a non-directional or non-oriented pattern on a rapidly-moving condensing surface, the finished web will be stronger in the longitudinal direction than in the lateral direction. If the strands are deposited in the manner described in copending application Ser. No. 430,849, now U.S. Pat. No. 3,949,130, with 50% of the strands oriented at 45° to longitudinal direction and the remaining 50% oriented at 135° to the longitudinal, a web can be produced which is as strong or stronger in the lateral direction as in the longitudinal direction.

Any cold drawable strand can be used in the web 10 such as polyethylene, polypropylene, nylon, polyester, vinyls, acrylics, etc.

The meshing tooth stretching rollers stretch the individual strands around the teeth and deform the strands so that they do not lie in one line or one plane but are positioned in the web in the width, length, and depth dimensions. This isotrophic formation increases softness, texture, and drapability in addition to increasing the strength of individual strands by stretching the strands in intermittent positions along its length in varying degrees or amounts.

The deposition of a web from molten strands results in fusion at a substantial number of the strand crossover points which remain fused after passing through several pairs of meshing-toothed stretching rollers. The heavier cross-over points are flattened between the teeth of the web and emerge as a corrugated sheet. Individual fibers and filaments are intermittently drawn regardless of their direction of lay-down in the sheet. The corrugated web has an increased thickness despite an increased area in both lateral and longitudinal directions.

In the incremental stretching of this invention, there is no grabbing at the edges of the web as is the case when lateral or bi-axial drawing is performed in tentering frames with individual clamping fingers or between diverging belts pulling from the edges. In the method of this invention, there is a uniform spreading or drawing action across the face of the web for a consistently uniform density fabric. The stretching in quilted patterns does two things. First, the individual strands are stretched in increments along their length. Secondly, since the stretched increments are stretched around a tooth form and not in a straight line, they remain in a corrugated shape, thereby giving the web a fabric-like hand, softness, stretch, and bulk.

In a tentering operation or diverging belt operation, light, thin, weak areas are stretched more than heavy, thick, strong areas, with the result that the weak areas are over-stretched to the point of tearing and the strong areas are not stretched, which then results in a web with more variations in uniformity than the original web. In stretching with the meshing-toothed stretching rollers of this invention, the thin areas are stretched less and the thick areas are stretched more, with the resultant web being more uniform than the original web.

Some thermoplastic resins when melt-blown are brittle when left in the unstretched condition. Passing a web of melt-blown strands through at least one pair of meshing-toothed stretching rollers stretches the individual strands by small increments regardless of their diameter variations or the total thickness of the web. Since the stretching is along the strand lengths, the stretched strands are molecularly oriented along their lengths and lengthened with the corresponding decrease in their diameters. This molecular orientation changes the brittle, weak strands to stronger, tougher, non-brittle strands, even though they have reduced diameters. Many strands are not stretched along their full length, but have partially-stretched sections and sections with no stretching, with the fine result that the web is yieldable under stress. The use of a helical-toothed form on pairs of stretching rollers results in an expansion in the lateral as well as the longitudinal direction of the web. This is a result of stretching all of the strands in a random laid web regardless of their angular orientation with respect to the longitudinal axis of the web. All of the strands are stretched simultaneously as they approach the center line of the two matching stretching rollers. A pass through a first pair of stretching rollers having a helix angle oriented in one direction, followed by a second pass through a pair of stretching rollers having a helical angle oriented at 90° to the first helix angle, results in stretching of substantially all of the strands, since the strands parallel to the teeth of the first stretching roller are 90° to the teeth of the second stretching roller and will then be stretched.

Although the disclosure herein has been principally directed at the stretching of webs, films may also be incrementally gripped and stretched and some of the same benefits are afforded by the methods set forth herein to minimize dominant weak zones. The film can be biaxially oriented in either the longitudinal or lateral direction, depending on the helix angle.

When passed through 1 set of rollers or gears, concurrent gripping, crimping, stretching and in some cases flattening of the web produces a finished web which has undrawn or partially drawn parallel lines or narrow areas across the web alternating with drawn parallel lines. When followed by a pass through a set of rolls with the opposite helix angle, diamonds, squares, rectangles or rhombuses, subsequently referred to as quadrilaterals, are formed with little or no drawing. This results in a strong yet highly resilient sheet or web which can withstand high shock loads before splitting.

The web is kept under much better control between pairs of stretch rolls if helical gears are used rather than spur or tooth forms which are parallel to the axis. The reason for the better infeed control of the web into succeeding pairs of helical stretch rolls is that the helical tooth forms incrementally draw or stretch the web laterally and longitudinally at the same time. Thus, there is continuous drawing with helical forms whereas with spur gears the beginning of contact between teeth and film is intermittant resulting in jerky stretching compared to smooth stretching when using helical forms.

The foregoing disclosure indicates that when an undrawn web is passed thru two sets of meshing toothed rollers having different helix angles or the teeth of the second set are transverse to the teeth of the first set, there is formed a pattern of generally quadrilaterally shaped undrawn islands bounded fully on each of their four sides by an axially drawn area and with each quadrilateral island being contiguous at each of its four apices to a biaxially drawn area. Passing the patterned web thru third and fourth sets of meshing toothed rolls having the same circular pitch and helix angles as the first and second sets break up these islands into smaller areas and which still have generally quadrilateral shapes.

When an undrawn web is passed thru three or more sets of meshing toothed rollers having different helix angles polygonal shaped undrawn islands are formed bounded fully on their sides by an axially drawn area, the area being oriented in different direction, each polygonal island is contiguous at each of its apices to a biaxially or multiaxially drawn area.

When an axially partially drawn web is passed thru two sets of helical rolls the quadrilateral islands are axially partially drawn.

When a biaxially partially drawn web is passed thru two sets of helical rolls the quadrilateral islands are biaxially partially drawn. The first and second sets of rolls superimpose a pattern on the partially drawn web in which the areas bounding the four sides are biaxially drawn and the apice areas multiaxially drawn, with accompanying increase in tensile strength and drapability.

When a web is passed thru a first set of rolls having a helix angle of from 0° to 90° then passed thru a second set with a different helix angle or the teeth of the second set being transverse to the first set, quadrilateral islands are produced.

When a web is passed thru three sets of rolls having different helix angles polygonal islands having 3, 4, 5 and 6 sides are produced.

When a web is passed thru four sets of rolls having different helix angles polygonal islands having 3, 4, 5, 6, 7 and 8 sides are produced. The maximum number of sides for any islands produced is equal to twice the number of sets of rolls employed.

Varying the circular pitch in combination with the helix angles varies the quantities of the various polygonal islands having a certain number of sides.

FIG. 26 illustrates the quilt pattern produced when a web is processed through 3 pairs of rollers. The first pair of rollers has a 0° helix angle with the teeth thus parallel to the axis of rotation of the gears. The second pair of gears has a helix angle of 30° and the third set an angle of 90° with respect to the axis of the gears. In FIG. 26 the undrawn island 300 is four sided, the undrawn island 302 is six sided and the undrawn island 304 is three sided. In the claims polygonal means 3 or 4 or more sides for an island. The word transverse in the claims means at any angle other than parallel.

The web processed through the toothed rollers can be a film which is either cast or melt blown. The web can also be pre-drawn in one direction by conventional techniques such as sets of draw rollers prior to passing the web through a set of toothed rollers with teeth at an angle to the machine direction or prior draw direction.

The web processed can also be a lamina as previously described and when the lamina includes undrawable absorbent fibers the undrawn islands include more absorbent fibers than the drawn areas. This is because the fibers are pulled apart in the drawn areas. The resulting web with absorbent islands surround by less dense areas is advantageously used where a quick strike through of fluids and also absorbency is desirable. In addition the fabric is more breathable around the islands than through the islands making the fabric usable in garments. If the fabric is treated with fire retardent chemicals for hospital gown usage more of the chemical will be absorbed in the islands and thus the surrounding areas remain breathable.

What is claimed is:

1. A fabric having spaced apart sets of substantially undrawn quadrilateral areas, said quadrilateral areas lying in lines at an angle to the machine direction axis of the web, said undrawn quadrilateral areas bounded on two parallel sides by areas axially drawn parallel to angle A and bounded on the remaining sides by areas axially drawn normal to angle A.

2. The fabric of claim 1 wherein angle A is equal to zero degrees.

3. The fabric of claim 1 where angle A is equal to 90°.

4. The fabric of claim 1 where angle A is between 0 and 90 degrees.

5. A fabric which is composed at least in part of cold drawable strands which are incrementally stretched along a set of spaced parallel stretch zones that are relatively close together compared to the dimensions of the fabric.

6. The fabric of claim 5 wherein the strands of said fabric are squeezed together along spaced parallel grip zones which are parallel to said stretch zones and spaced therebetween.

7. The fabric of claim 5 wherein portions of said fabric are squeezed together within said stretch zones.

8. The fabric of claim 5 wherein the cross-points of at least some of said strands are bonded together, and wherein at least the larger of said bonded cross-points are flattened.

* * * * *